(12) United States Patent
Akagawa et al.

(10) Patent No.: US 8,715,543 B2
(45) Date of Patent: May 6, 2014

(54) MICROENCAPSULATED CURING AGENT

(75) Inventors: Mitsuru Akagawa, Ibaraki (JP); Takuya Yasuhara, Tokyo (JP)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/436,161

(22) Filed: Mar. 30, 2012

(65) Prior Publication Data

US 2012/0248639 A1 Oct. 4, 2012

Related U.S. Application Data

(60) Provisional application No. 61/470,028, filed on Mar. 31, 2011.

(51) Int. Cl.
*B29C 45/02* (2006.01)
*C08L 75/04* (2006.01)
*B01J 13/18* (2006.01)

(52) U.S. Cl.
USPC ........... 264/4.33; 264/279; 525/123; 525/453

(58) Field of Classification Search
CPC ...................................... C08L 75/04
See application file for complete search history.

(56) References Cited

U.S. PATENT DOCUMENTS

| | | | |
|---|---|---|---|
| 3,395,105 A | 7/1968 | Washburn et al. | |
| 3,892,581 A | 7/1975 | Burgman et al. | |
| 4,080,238 A | 3/1978 | Wolinski et al. | |
| 4,154,774 A | 5/1979 | Hinterwaldner | |
| 4,303,736 A | 12/1981 | Torobin | |
| 4,362,566 A | 12/1982 | Hinterwaldner | |
| 4,428,983 A * | 1/1984 | Nehen et al. | 427/213.34 |
| 4,528,354 A | 7/1985 | McDougal | |
| 4,547,429 A | 10/1985 | Greiner et al. | |
| 4,622,267 A | 11/1986 | Riecke | |
| 4,808,639 A | 2/1989 | Chernack | |
| 4,876,296 A | 10/1989 | Miller et al. | |
| 5,084,494 A * | 1/1992 | McDougal | 523/211 |
| 5,132,052 A | 7/1992 | Cobbledick et al. | |
| 5,357,008 A | 10/1994 | Tsai et al. | |
| 5,589,523 A | 12/1996 | Sawaoka et al. | |
| 7,959,838 B2 | 6/2011 | Takano et al. | |
| 2005/0058822 A1 | 3/2005 | Ittel | |
| 2007/0059526 A1 | 3/2007 | Lienert et al. | |

FOREIGN PATENT DOCUMENTS

| | | |
|---|---|---|
| EP | 287288 | 10/1988 |
| EP | 552976 | 7/1993 |
| GB | 1148635 | 4/1969 |
| GB | 1331286 | 1/1975 |
| GB | 1539809 | 2/1979 |
| JP | 73003238 | 1/1973 |
| JP | 73019545 | 6/1973 |
| JP | 52077003 | 6/1977 |
| JP | 56076432 | 6/1981 |
| JP | 57012017 | 1/1982 |
| JP | 59502018 | 12/1984 |
| JP | 60028449 | 2/1985 |
| JP | 60139331 | 7/1985 |
| JP | 63004919 | 1/1988 |
| JP | 1190399 | 7/1989 |
| JP | 1-282250 | 11/1989 |
| JP | 2052038 | 2/1990 |
| JP | 2058546 | 2/1990 |
| JP | 4175321 | 6/1992 |
| JP | 4372644 | 12/1992 |
| JP | 5078411 | 3/1993 |
| JP | 5138793 | 6/1993 |
| JP | 6009802 | 1/1994 |
| JP | 6100638 | 4/1994 |
| JP | 7-090907 | 4/1995 |
| JP | 7304968 | 11/1995 |
| JP | 8012861 | 1/1996 |
| JP | 8020708 | 1/1996 |
| JP | 8041174 | 2/1996 |
| JP | 9143244 | 6/1997 |
| JP | 11043618 | 2/1999 |
| JP | 2001-114757 | 4/2001 |
| JP | 2001-302760 | 10/2001 |
| JP | 2001-316451 | 11/2001 |
| JP | 2003-253089 | 9/2003 |
| JP | 2004-075914 | 3/2004 |
| JP | 2005-226014 | 8/2005 |
| WO | 84/01919 | 5/1984 |
| WO | 93/15131 | 8/1993 |
| WO | 02/16482 | 2/2002 |
| WO | 03/086611 | 10/2003 |
| WO | 11/073111 | 6/2011 |

OTHER PUBLICATIONS

Derwent Abstract, Microcapsules encapsulating oil-soluble organic peroxide, Feb. 21, 1990, JPO, JP 02052038A, p. 1-3.*
International Search Report and Written Opinion from PCT/US12/31456 dated Oct. 4, 2012.
Arnaud, et al., "A study of the polymerization of thermosetting polymers, and of a microencapsulated peroxide curing agent", 1998, Travaux Universitaires, Abstract only.
Summary of Product Features, Lipo Technologies, 9 pgs., available on the world-wide-web before Mar. 31, 2011.
Koishi, M. "Development and Applicaion of Micro/Nanosystem Capsules and Fine Particles", CMC Publishing, New Materials and Advanced Materials Series, Table of Contents and pp. 94-98, publication page, 2009.
Koishi, M. et al., "Making + Using Microcapsules", Table of Contents, pp. 12-16, publication page, Oct. 18, 2005.
International Search Report and Written Opinion from PCT/US12/068132 dated Mar. 15, 2013.

* cited by examiner

*Primary Examiner* — Randy Gulakowski
*Assistant Examiner* — Jeffrey Washville
(74) *Attorney, Agent, or Firm* — Calfee, Halter & Griswold LLP

(57) ABSTRACT

A curing agent for unsaturated polyester resins is made by microencapsulating an organic peroxide curing agent in a polyurethane protective coating or shell.

18 Claims, No Drawings

MICROENCAPSULATED CURING AGENT

CROSS-REFERENCE TO RELATED APPLICATION

This is application is based on prior U.S. provisional application Ser. No. 61/470,028, filed Mar. 31, 2011, the benefit of which is hereby claimed and the disclosure of which is incorporated herein by reference in its entirety.

BACKGROUND

Sheet molding compounds ("SMC"), bulk molding compounds ("BMC") and thick molding compounds ("TMC") are fiber reinforced thermosetting resin molding compositions (sometimes referred to hereinafter as "compounds" in accordance with customary practice in this field) which are widely used in industrial molding processes such as compression molding, etc. Such fiber reinforced thermosetting resin molding compounds typically comprise a curable polymer resin and a curing agent capable of causing the resin to rapidly cure when the molding compound is heated or otherwise processed to activate the curing agent.

In order to increase productivity, such fiber reinforced thermosetting resin molding compounds are often made with high activity curing agents. Unfortunately, this often leads to a corresponding decrease in shelf life relative to conventional fiber reinforced thermosetting resin molding compounds, which typically have a shelf life on the order of three months or so. To deal with this problem, it has already been proposed to microencapsulate the curing agent in a suitable protective coating or shell.

For example, WO 84/01919, the entire disclosure of which is incorporated herein by reference, describes a process for making microencapsulated curing agents for unsaturated polyester resin SMCs and BMCs in which an organic peroxide curing agent is microencapsulated in a phenol-formaldehyde resin shell. A problem with this approach, however, is that the curing agent may evolve suddenly in response to the rising temperature encountered during the molding process. This can lead to a non-uniform distribution of the curing agent in the resin being molded, which in turn can cause an irregularity of cure and hence poor surface appearance of the molded product obtained.

An alternative approach is described in JP 4175321, the entire disclosure of which is also incorporated herein by reference. In this approach, the organic peroxide curing agent is microencapsulated in gelatin or the like. Unfortunately, the shelf life of such molding compounds is unacceptably short, especially those containing styrene or analogous monomer, which is believed due to reaction of the thermosetting resin with curing agent leaking out of the microcapsules by contact with the styrene. Moreover, when the microencapsulated curing agent is dried powder, curing of the resin may be insufficient, which is believed due to the fact that the pressure created by the molding process is inadequate to cause the curing agent to evolve fully from its microcapsules.

SUMMARY OF THE INVENTION

In accordance with this invention, it has been found that these problems can be avoided by microencapsulating the curing agent in a coating or shell made from a polyurethane resin.

Thus, this invention provides a microencapsulated curing agent for use in curing a thermosetting resin, the microencapsulated curing agent comprising an organic peroxide curing agent and a shell formed from a polyurethane resin encapsulating the organic peroxide curing agent, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 4 wt. %.

Preferred microcapsules exhibit a loss of weight of at least 18 wt. % when heated to 140° C. for 5 minutes.

In addition, this invention also provides a molding compound comprising a thermosetting resin and the above microencapsulated curing agent.

DETAILED DESCRIPTION

Thermosetting Resin Composition

This invention can be used to make microencapsulated curing agents for any type of thermosetting resin composition. Specific examples of thermosetting resins that can be used to make the thermosetting resin compositions of this invention include unsaturated polyester resins, vinyl ester resins and epoxy resins. Unsaturated polyester resins and especially unsaturated polyester resin compositions containing styrene, vinyl toluene and other vinyl polymerizable monomers, especially vinyl polymerizable aromatic monomers, as cross-linking agents are especially interesting.

Thermosetting resin compositions used for molding operations often combine with reinforcing fibers to make a fiber reinforced thermosetting resin molding compound, and such reinforcing fibers can be included in the inventive thermosetting resin molding compound if desired. Examples include glass fibers, carbon fibers, etc. Glass fibers having a filament diameter of 5-20μ are especially interesting. Such glass fibers can be continuous or chopped, and if chopped desirably have a length of 10-100 mm. In addition, such filaments can also be formed into strands. Strands have a yarn count (weight per unit length) of 500-5,000 gm/km are especially interesting as are those having a bundling number 50-200 filaments per strand. If desired, such glass fibers, and/or the strands and yarns made therefrom can be coated with a suitable sizing agent containing a silane coupling agent, the sizing agent also optionally containing a film foaming agent such as a polyurethane or polyvinyl acetate resin, and other conventional ingredients such as cationic and nonionic surfactants and the like. Sizing amounts of 0.2 to 2 wt. %, based on the weight of the glass fiber being coated, are typical.

Any amount of reinforcing fibers can be included in the inventive thermosetting resin molding compounds. Reinforcing fiber concentrations on the order of 10 to 60 wt. %, preferably 20 to 50 wt. %, based on the weight of the thermosetting composition as a whole, are typical.

The thermosetting resin compositions of this invention can also contain a wide variety of additional ingredients including conventional fillers such as calcium carbonate, aluminum hydroxide, clays, talcs and the like, thickeners such as magnesium oxide and magnesium hydroxides and the like, low shrinkage additives such as polystyrene, etc., mold release agents such as zinc stearate, etc., ultraviolet light absorbers, flame retardants, anti-oxidants, and the like. See, for example, pages 1-3, 6 and 7 of the above-noted WO 84/01919. In addition, a conventional organic peroxide curing agent (i.e., a curing agent which is not encapsulated) can be also be included in the thermosetting resin composition, if desired.

Thermosetting resin molding compounds containing unsaturated polyester resin compositions and reinforcing fibers, particularly fiberglass reinforcing fibers, are especially interesting.

Curing Agents

This invention can be used to microencapsulate essentially any material which is capable of initiating crosslinking of the particular thermosetting resin being cured. Normally, the curing agent will be an organic peroxide which decomposes with heat to yield free radicals.

As appreciated by those skilled in the art, heat activated curing agents for thermosetting resins desirably remain essentially unreactive until they reach their predetermined activation temperatures, at which time they rapidly react (decompose) to yield free radicals for curing.

One analytical test for measuring the ability of a curing agent to remain essentially unreactive at lower temperatures is the active oxygen residual ratio at 40° C. test. In accordance with this test, a quantity of the curing agent is maintained at 40° C. for 48 hours and then the amount active oxygen (i.e., the proportion of curing agent that remains active to produce free radicals) is determined by heating the curing agent to its activating temperature. The preferred microencapsulated curing agents of this invention desirably exhibit an active oxygen residual ratio at 40° C. of at least 80%, more desirably at least 95%.

An analytical test for measuring the ability of a curing agent to rapidly react at its activation temperature is the one minute half life temperature test. In accordance with this test, a quantity of the curing agent is heated for one minute at an elevated temperature and the proportion of curing agent that remains active to produce free radicals is then determined. The test is repeated at a variety of different temperatures to determine the temperature at which half the curing agent remains active, which is taken as the one minute half life temperature of the curing agent. The preferred microencapsulated curing agents of this invention desirably exhibit a one minute half life temperature of about 115° C. to 140° C., more desirably about 120° C. to 130° C.

Specific curing agents which exhibit an active oxygen residual ratio when heated for 48 hours at 40° C. of at least 80% and a one minute half life temperature of about 115° C. to 140° C. include dilauroyl peroxide, t-butyl peroxy-2-ethylhexanoate, 1,1,3,3-tetramethyl butylperoxy-2-ethylhexanoate, t-amyl-2-peroxy-2-ethylhexanoate and dibenzoyl peroxide, with t-amyl-2-peroxy-2-ethylhexanoate and dibenzoyl peroxide being preferred.

Polyurethane Microencapsulation

In accordance with this invention, the above curing agents are microencapsulated in a polyurethane resin protective coating by means of interfacial polymerization. Interfacial polymerization is a process wherein a microcapsule wall of a polymer resin such as a polyamide, an epoxy resin, a polyurethane resin, a polyurea resin or the like is formed at an interface between two phases. In this invention, the basic approach of the interfacial polymerization process is to (a) dissolve the peroxide curing agent and the isocyanate forming the polyurethane in an organic solvent which is essentially immiscible with water and a non-solvent for the polyol and optional polyamine forming the polyurethane, (b) emulsify the organic solution so formed in an aqueous phase by vigorous mixing, and then (c) add the polyol and optional polyamine to the emulsion so formed with continuous mixing to cause the polyurethane to form at the interface of the emulsified particles.

Forming microcapsules by interfacial polymerization is well-known and described in a number of publications. For example, such techniques are described in Masumi, et al., CREATION AND USE OF MICROCAPSULES, "1-3 Manufacturing Method and Use of Microcapsules," Page 12-15, © 2005 by Kogyo Chosa Kai K. K. (ISBN4-7693-4194-6 C3058. Such techniques are also described in Mitsuyuki et al., APPLICATION AND DEVELOPMENT OF MICRO/NANO SYSTEM CAPSULE AND FINE PARTICLES, "4-3 Manufacturing method of Thermal Responsive Microcapsules," Page 95-96, 2003 by K. K. CMC Shuppan (ISBN978-4-7813-0047-4 C3043).

See, also, U.S. Pat. No. 4,622,267, which discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique used to encapsulate salts which are sparingly soluble in water in polyurethane shells is disclosed in U.S. Pat. No. 4,547,429.

Any of these techniques can be used for making the microencapsulated curing agents of this invention. Normally, these techniques will be carried out so that the amount of organic peroxide curing agent forming the core of the product microencapsulated curing agent constitutes at least about 15 wt. %, more typically at least about 20 wt. %, at least about 25 wt. %, at least about 30 wt. %, at least about 35 wt. %, or even at least about 40 wt. %, of the inventive microencapsulated curing agent as a whole. Amounts of organic peroxide curing agent on the order of 15 to 70 wt. %, 30 to 70 wt. % or even 40 to 70 wt. %, based on the weight of the product microencapsulated curing agent as a whole, are more interesting.

Product Microcapsules

The interfacial polymerization process adopted by this invention is preferably carried out to produce product microcapsules having a desired combination of particle size, activity, heat stability and chemical stability.

Particle Size and Form

Regarding particle size, for achieving a uniform distribution of the microencapsulated curing agent in the thermosetting resin composition as well as sufficient activity in terms of evolving the desired amount of organic peroxide, the inventive microcapsules desirably have an average particle size of about 5 µm to 500 µm (microns), preferably 30 µm to 300 µm, more preferably 50 µm to 150 µm.

Also, when combined with a thermosetting resin and other ingredients for making a particular thermosetting resin compositions in accordance with this invention, the inventive microcapsules are desirably in the form of a dried powder or a liquid slurry. Dried powders are preferred, as they promote good dispersibility in the resin compositions in which they are contained. Dried powders can also avoid the ill effects of moisture.

Thermal Characteristics-Activity

To insure that the inventive microcapsules rapidly decompose to liberate sufficient organic peroxide at their predetermined activation temperatures, the inventive microcapsules desirably exhibit a decrease in the net amount of organic peroxide contained therein of at least 4 wt. %, preferably at least 18 wt. %., more preferably at least 22 wt. %, or even at least 25 wt. %, when heated to 140° C. for 5 minutes. This can easily be determined by comparing the decrease in gross weight of the microcapsule in response to this heating regimen with the total weight of the organic peroxide in the original microcapsule, since essentially all of the decrease in weight experienced by the microcapsule when heated will be due to decomposition of its organic peroxide. The rapid decomposition and liberation of organic peroxide specified in this thermal activity test is especially desirable for microcapsules used in fiber reinforced thermosetting resin molding compounds, such as SMC, where curing needs to be very rapid once the predetermined curing temperature is reached.

Thermal Characteristics-Long Term Stability

To prevent premature ageing or thickening of fiber reinforced thermosetting resin molding compounds (e.g., SMC) containing the inventive microcapsules, these microcapsules should exhibit a decrease in the net amount of organic peroxide contained therein of no more than 10 wt. %., preferably no more than 8 wt. %, more preferably no more than 7 wt. %, even more preferably no more than 5 wt. %, no more than 3 wt. % or even no more 2 wt. %, when heated to 100° C. for 30 minutes. This is desirable for insuring that fiber reinforced thermosetting resin molding compounds containing the inventive microcapsules (e.g., SMC) exhibit a sufficient shelf life.

Thermal Characteristics-Short Term Stability

To achieve good surface appearance in molded articles made with fiber reinforced thermosetting resin molding compounds containing the inventive microcapsules, the inventive microcapsules also desirably exhibit a decrease in the net amount of organic peroxide contained therein of no more than 5 wt. %., preferably no more than 4 wt. %, more preferably no more than 2 wt. % or even no more than 1 wt. %, when heated to 140° C. for 30 seconds. When a molding compound is compression molded, there is normally a slight delay between the time the molding compound is charged into the heated metal mold and the molding compound is pressurized inside the mold for completing the molding operation. Poor surface appearance, e.g., inadequate smoothness, is often caused by different portions of the molding compound being exposed to different curing conditions inside the mold. For example, the curing conditions experienced by molding compound directly touching the heated metal surfaces of the mold are normally more severe, at least slightly, than the curing conditions experienced by other portions of the molding compound. To achieve good surface appearance in the molded articles obtained (e.g., smoothness), it is therefore desirable that curing does not substantially begin until the increase in molding pressure is achieved, so that this difference does not occur. Therefore, it is also desirable that inventive microcapsules exhibit the short term thermal stability described here, as this insures that premature curing of the thermosetting resin is avoided.

Chemical Stability

To avoid deleterious effects due to leakage of the organic peroxide, the inventive microcapsules should exhibit a decrease in the net amount of organic peroxide contained therein of no more than 15 wt. %., preferably no more than 10 wt. %, more preferably no more than 5 wt. %, when soaked in styrene monomer for 48 hours at 23° C. Microcapsules exhibiting no leakage of the organic peroxide when subjected to these conditions are even more desirable. This resistance against degradation in styrene monomer is desirable for insuring that fiber reinforced thermosetting resin molding compounds, such as SMC, containing the inventive microcapsules exhibit a sufficient shelf life.

Raw Materials

As raw materials of the polyurethane resin, an isocyanate and a polyol can be mainly used. For example, xylylene diisocyanate (XDI), hydrogenated xylylene diisocyanate ($H_6$XDI), hexamethylene diisocyanate (HDI), isophorone diisocyanate (IPDI), tolylene diisocyanate (TDI), diphenylmethane diisocyanate (MDI) or a polyisocyanate comprising one or more of these isocyanates can be used as the isocyanate. As for the polyol, any polyol which is at least partially soluble in water can be used. Examples include glycerin, polyethylene glycol, butanediol and water. Polyethylene glycols are preferred, especially those having molecular weights of 200 to 20,000, more typically 200 to 10,000 or even 200 to 5,000.

The activity, heat stability and chemical stability of the inventive curing agent microcapsules depend, among other things, on the raw materials and the wall thickness of the polyurethane resin protective coating which microencapsulates the organic peroxide curing agent. To this end, especially for chemical stability, the isocyanate used to make the polyurethane resin coating of the inventive microcapsules is preferably selected from one or more of xylylene diisocyanate, hydrogenated xylylene diisocyanate, hexamethylene diisocyanate, isophorone diisocyanate and polyisocyanates obtained from these diisocyanates, while the polyol used to make this polyurethane resin is preferably selected from one or more of polyethylene glycol and water.

In addition, to the isocyanate and polyol, a polyamine can also be included in the reaction system for making the polyurethane shell of the inventive microcapsules, if desired. Polyamines react more quickly with polyisocyanates, and therefore can be used to help control the rate at which the interfacial polymerization reaction occurs. In addition, polyamines with functionalities greater than two can introduce chain branching (crosslinking) into the polyurethane and hence help control the properties of the polyurethane ultimately produced. Any polyamine which is at least partially soluble in water can be used for this purpose. Diamines and especially hexamethylene diamine are preferred.

While any amount of this optional polyamine can be used, typically the amount will be >0 to 50 wt. %, more typically, about 20 to 48 wt. % or even 25 to 45 wt. % of the combined amounts of polyol and polyamine.

As mentioned in the above publications discussing interfacial polymerization, it may also be desirable to include a colloid-forming agent in the aqueous phase of such reaction systems, as such materials control interfacial tension thereby stabilizing the shape of the emulsified particles. In addition, such materials also form a layer of protective colloid on the surfaces of these particles. Any colloid-forming material which is known to be useful as a colloid-forming agent in interfacial polymerization can be used as the colloid-forming agent in this invention. Polyvinyl alcohol, hydroxymethyl cellulose, and similar thickening agents are preferred.

Wall Thickness

The coating or shell made from this polyurethane resin preferably has a wall thickness on the order of about 0.2 μm to 80 μm, more typically about 0.5 μm to 50 μm or even about 1 to 10 μm. These raw materials and wall thickness are desirable for achieving the desired combination of heat stability, chemical stability and activity discussed above. Wall thicknesses which are too thin may lead to premature leaking of the curing agent, which in turn may lead to inadequate shelf life. Conversely, wall thicknesses which are too large may lead to inadequate activity, which in turn may lead to insufficient curing and/or poor surface appearance. Generally speaking, the particular wall thickness needed to achieve a desired combination of heat stability, chemical stability and activity depends on many factors including the particular curing agent used and the particular operating characteristics desired in the product curing agent microcapsules to be made. This can easily be determined by routine experimentation.

Loadings

The amount of inventive microcapsules that can be included in thermosetting resin compositions made in accordance with this invention can vary widely, and essentially any amount can be used. In general, the amount of inventive microcapsules included in a particular thermosetting resin composition should be sufficient so that the net amount of organic peroxide present is about 0.5 to 5 PHR (parts per hundred parts resin by weight), more typically 0.8 to 4 PHR, or even 1 to 3 PHR.

WORKING EXAMPLES

In order to more thoroughly describe this invention, the following working examples are provided.

Examples CA-1 and Comparative Examples CA-A to CA-F

A microencapsulated curing agent made in accordance with this invention (Curing Agent CA-1) was prepared by microencapsulating 34.5 wt. % of an organic peroxide comprising t-amyl peroxy 2-ethylhexanoate in a polyurethane shell by interfacial polymerization as follows.

A core material was prepared by mixing, agitating and dissolving 100 parts by weight of TRIGONOX 121 (curing agent available from Kayaku Akzo Corporation containing 94 wt. % of t-amyl peroxy 2-ethylhexanoate) and 40 parts by weight of XDI polyisocyanate in 100 parts by weight of tricresyl phosphate (TCP). The core material was poured into 500 parts by weight of an aqueous solution of polyvinyl alcohol (PVA), and the mixture so obtained then agitated at high speed to emulsify the core material in the aqueous phase. Mixing was continued until the average diameter of emulsified droplets decreased to about 100 μm, about 1.5 hours. 4 parts by weight of polyethylene glycol and 3 parts by weight of hexamethylenediamine were then added, and the mixture so formed allowed to react for 3 hours at 50° C. As a result, a slurry of microcapsules having an average diameter of 100 μm, a core composed of TRIGONOX 121 and TCP, and a shell formed from a polyurethane resin was obtained. These microcapsules were then removed from the slurry and vacuum dried to produce Curing Agent CA-1 of Example CA-1.

Six additional curing agents (Curing Agents CA-A to CA-F) were also prepared for comparative purposes. Like Curing Agent CA-1, Curing Agents CA-A and CA-B were also made in the form of microcapsules with cores composed of t-amyl peroxy 2-ethylhexanoate as the organic peroxide. However, Curing Agents CA-A and CA-B were made using conventional coacervation techniques rather than the interfacial polymerization process of this invention. In addition, Curing Agent CA-B was provided in the form of a wet slurry rather than dried powder.

In contrast to Curing Agents CA-1, CA-A and CA-B, Curing Agents CA-C and CA-D were conventional, commercially-available curing agents in liquid form. Curing Agent CA-C was composed 100% of TRIGONOX 121-50E available from Kayaku Akzo Corporation, which contains 50 wt. % of t-amyl peroxy 2-ethylhexanoate. Curing Agent CA-D was composed 100% of PERCURE HI available from NOF Corporation, which contains 92 wt. % of a mixture mainly composed of t-Butyl peroxy isopropyl monocarbonate.

Finally, Curing Agent CA-E was prepared. using the same interfacial polymerization process used to prepare Curing Agent CA-1 of this invention, except that the isocyanate used to make the polyurethane of Curing Agent CA-1, XDI, was replaced with MDI and, in addition, the curing agent used to make Curing Agent CA-1, TRIGONOX 121, was replaced with TRIGONOX 121-50E. Similarly, Curing Agent CA-F was prepared. using the same interfacial polymerization process used to prepare Curing Agent CA-1 of this invention, except that the isocyanate used to make the polyurethane of Curing Agent CA-1, XDI was replaced with TDI and, in addition, the organic solvent used to make the core of Curing Agent CA-1, tricresyl phosphate, was replaced with diethyl phthalate (DEP).

These curing agents are further described in the following Table 1:

TABLE 1

Type and Composition of Curing agents

| | Curing Agent | | |
|---|---|---|---|
| | CA-1 | CA-A | CA-B |
| Type | microcapsule | microcapsule | microcapsule |
| Form | dried powder | dried powder | wet slurry |
| Shell | polyurethane A | gelatin | gelatin |
| Method of making | interfacial polymerization | coacervation | coacervation |
| Peroxide content, wt. % | 34.5 | 47 | 47 |
| average particle size, μm | 90 | 100 | 100 |
| Wall thickness, μm | 2.4 | 1.4 | 0.9 |

| | Curing Agent | | |
|---|---|---|---|
| | CA-C | CA-D | CA-E | CA-F |
| Type | non-microcapsule | non-microcapsule | microcapsule | microcapsule |
| Form | liquid | liquid | dried powder | dried powder |
| Shell | — | — | polyurethane B | polyurethane C |
| Method of making | — | — | interfacial polymerization | interfacial polymerization |
| Peroxide content, wt. % | 50 | 92 | 21 | 41 |
| average particle size, μm | — | — | 100 | 100 |
| Wall thickness, μm | — | — | 2.8 | 2.6 |

Some of these curing agents were then subjected to a series of analytical tests to measure their thermal characteristics, in particular their long term thermal stability, short term thermal stability and thermal activity. These tests were carried out by placing about 0.2 gm of the curing agent into an aluminum foil cup, measuring the weight of the filled cup, heating the cup under the time/temperature conditions prescribed by the test, measuring the weight of the filled cup after the prescribed heating regimen, and then calculating the amount of curing agent lost as a percentage of the total amount of organic peroxide included in the original microcapsule being tested. In other words, the decrease in total weight of the organic peroxide, in percent, is calculated by dividing the decrease in gross weight of the microcapsule, in percent, by the content of organic peroxide in the original microcapsules, in percent.

The results obtained are set forth in the following Table 2:

TABLE 2

Thermal Characteristics of Curing agents

| | Curing Agent | | | | |
|---|---|---|---|---|---|
| | CA-1 | CA-A | CA-C | CA-E | CA-F |
| Long Term Stability (100° C. for 30 min.), wt. % | 6.7 | 7.2 | 53.4 | 10.1 | 9.1 |
| Short Term Stability (140° C. for 0.5 min.), wt. % | 3.5 | 16.4 | 16.7 | 7.0 | 17.0 |
| Activity (140° C. for 5 min.), wt. % | 28.7 | 27.3 | 60.9 | 38.8 | 72.0 |

As can be seen from Table 2, curing agent CA-1 of this invention not only exhibits substantial thermal activity, as reflected by an activity score of 28.7 but also very good long and short term thermal stabilities, as reflected by a long teen thermal stability score of 6.7 and a short term stability score of 3.5, respectively. In contrast, while comparative curing agent CA-C exhibits a significantly greater thermal activity as reflected by a very high thermal activity score of 60.9, it also demonstrate very poor long term thermal stability, as reflected by a very high long term thermal stability score of 53.4. Meanwhile, while comparative curing agent CA-A exhibits good thermal activity, its short terms thermal stability is poor, as reflected by a short term thalami stability score of 16.4, being about 60% of its thermal activity score of 27.3. Comparative curing agents CA-E and CA-F, which are microencapsulated by polyurethane resins different from CA-1, exhibited poor short terms thermal stability.

The microencapsulated curing agents produced above were also subjected to a chemical stability test. In accordance with this test, about 0.2 gm of the microencapsulated curing agent was kept in a vial containing 2 gms styrene for 24 and 48 hours at 23° C. A gas chromatograph was then used to determine if any of the organic peroxide, TCP or DEP in the microcapsule had leaked into the styrene. The amount of organic peroxide that leaked was quantified based on peak intensities (peak heights) of the relevant peaks of the gas chromatograph results. The proportion of organic peroxide that leaked, in percent, was calculated from the amount of organic peroxide that had leaked relative to the net amount of organic peroxide originally contained in microcapsule.

The results obtained are set forth in the following Table 3:

TABLE 3

Chemical Stability of Curing Agents

| | Curing Agent | | | | |
|---|---|---|---|---|---|
| | CA-1 | CA-A | CA-B | CA-E | CA-F |
| Form | dried powder | dried powder | wet slurry | dried powder | dried powder |
| Shell Material | polyurethane A | gelatin | gelatin | polyurethane B | polyurethane C |
| Percentage of Leakage (wt. %), after 24 hrs | 0 | 3.6 | 46.5 | 99.4 | 2.9 (also detected leakage of DEP) |
| Percentage of Leakage (wt. %), after 48 hrs | 0.4 | 3.4 | 53.5 | Not tested | 19.5 |

As can be seen from Table 3, the inventive curing agent CA-1, as well as the comparative microencapsulated curing agent CA-A, exhibited good chemical stability as reflected by no or minimal organic peroxide leakage. In contrast, comparative curing agent CA-B, which is provided in the form of an aqueous slurry exhibited poor chemical stability as reflected by organic peroxide leakage. Comparative curing agents CA-E and CA-F, which are microencapsulated by polyurethane resins different from CA-1, exhibited poor chemical stability as reflected by leakage of organic peroxide or DEP. In this connection, polyurethane A forming the shell of the inventive curing agent CA-1 consists of XDI polyisocyanate as one of its raw materials. In contrast, polyurethane B forming a shell of the comparative curing agent CA-E consists of MDI polyisocyanate as one of its raw materials, and polyurethane C forming a shell of the comparative curing agent CA-F consists of TDI polyisocyanate as one of its raw materials.

Examples MR-1 and Comparative Examples MR-A to MR-D

Curing agent CA-1 made in accordance with this invention was then used to make a molding resin in accordance with this invention (Molding Resin MR-1) by combining it with an unsaturated polyester resin and various additional additives and fillers. In the same way, curing agents CA-A to CA-D were formulated into comparative molding resins MR-A to MR-D by combining each with essentially the same amounts of the same unsaturated polyester resin and other additives and fillers.

The compositions of the molding resins so obtained is set forth in the following Table 4:

TABLE 4

Chemical Composition of Molding Resins, Wt. %

| | Molding Resin | | | | |
|---|---|---|---|---|---|
| | MR-1 | MR-A | MR-B | MR-C | MR-D |
| Curing Agent | CA-1 | CA-A | CA-B | CA-C | CA-D |
| Unsaturated polyester resin | 35.8 | 35.8 | 35.8 | 36.4 | 36.4 |
| Low shrinkage additive (polystyrene) | 15.4 | 15.4 | 15.4 | 15.6 | 15.6 |
| Curing Agent | 2.6 | 2.6 | 2.6 | 0.9 | 0.9 |
| Mold release agent (zinc stearate) | 3.3 | 3.3 | 3.3 | 3.4 | 3.4 |
| Low shrinkage additive (polyethylene) | 3.8 | 3.8 | 3.8 | 3.9 | 3.9 |

TABLE 4-continued

Chemical Composition of Molding Resins, Wt. %

| | Molding Resin | | | | |
|---|---|---|---|---|---|
| | MR-1 | MR-A | MR-B | MR-C | MR-D |
| Filler, calcium carbonate | 38.3 | 38.3 | 38.3 | 39.0 | 39.0 |
| Anti-separation ingredient | 0.3 | 0.3 | 0.3 | 0.3 | 0.3 |
| Thickener (magnesium oxide) | 0.5 | 0.5 | 0.5 | 0.5 | 0.5 |
| Total | 100.00 | 100.00 | 100.00 | 100.00 | 100.00 |

Some of these molding resins were subject to an accelerated shelf life test by dropping 2 gms of the molding resin onto a metal plate heated to 100° C. The state of the molding resin (solid, liquid or gel) was then determined by visual inspection with the aid of a spatula.

The results obtained are set forth in the following Table 5:

TABLE 5

Shelf Life of Selected Molding Resins

| | Molding Resin | | |
|---|---|---|---|
| | MR-1 | MR-C | MR-D |
| Curing Agent | CA-1 | CA-C | CA-D |
| Curing Agent type | microcapsule | liquid | Liquid |
| Curing Time, min. | 16 | 2.5 | 16 |
| Curing state | remained a gel | cure completed | remained a gel |

Molding resin MR-D, when used in a conventional sheet molding compound, has a shelf life of about three months. Table 5 shows that the inventive molding resin MR-1 exhibited essentially the same response to this accelerated shelf life test as conventional molding resin MR-D in that both remained in a gel state after remaining on the heated metal plate for 16 minutes. This suggests that inventive molding resin MR-1 will exhibit essentially the same shelf life as conventional molding resin MR-D. In contrast, comparative molding resin MR-C cured essentially completely in 2.5 minutes, thereby suggesting an inadequate shelf life.

Examples SMC-1 and Comparative Examples SMC-A to SMC-D

Molding resin MR-1 was then formulated into a sheet molding compound (SMC-1) by combining 60 wt. % molding resin MR-1 with 40 wt. % of a chopped glass fiber strand having a length of about 25 mm, the chopped glass fiber strand being made from a glass fiber strand having a yarn count of 75 gms/km, a bundling number of 150 filaments per strand and a filament diameter of 16 μm, the glass fiber strand being sized with 0.95 wt. % of a sizing agent containing a silane coupling agent, a polyurethane resin and a polyvinyl acetate resin. In the same way, molding resins MR-A to MR-D were formulated into a sheet molding compounds (SMC-A to SMC-D) by combining 60 wt. % of each molding resin with 40 wt. % of the same chopped glass fiber strand used to make sheet molding compound SMC-1.

Each of the sheet molding compounds so made was then molded into a flat plate having thickness of 3 mm by means of a heat-press molding machine in which an upper platen heated to a temperature of 140° C. and a lower platen heated to 145° C. were compressed together at a pressure of 80 kg/cm². After 1 minute under these conditions, the platens were opened and the molded plates visually inspected for surface appearance and condition of cure.

The results obtained are set forth in the following Table 6:

TABLE 6

Quality of Molded Products

| | Sheet Molding Compound | | | | |
|---|---|---|---|---|---|
| | SMC-1 | SMC-A | SMC-B | SMC-C | SMC-D |
| Curing Agent | CA-1 | CA-A | CA-B | CA-C | CA-D |
| Curing Agent Type | microcapsule | microcapsule | microcapsule | liquid | liquid |
| Curing Agent Form | dry powder | dry powder | Wet slurry | liquid | liquid |
| Curing Agent Shell | polyurethane | gelatin | gelatin | — | — |
| Cure After 1 minute | cured | not cured | cured | cured | not cured |
| Appearance | good | not evaluated | many dimple like defects | poor smoothness | not evaluated |

Table 6 shows that the molded plate produced from sheet molding compound SMC-1 of this invention exhibits both good cure and good surface appearance. In addition, Table 6 further shows that sheet molding compound SMC-1 of this invention cures faster than conventional sheet molding compound SMC-D, which typically cures in about 3 minutes. Table 6 further shows that the other comparative sheet molding compounds, sheet molding compounds SMC-A, SMC-B and SMC-C, either failed to cure complete or produced molded products exhibiting poor surface appearance.

From the foregoing, it can be seen that this disclosure includes at least the following points of invention:

A. A molding compound comprising a thermosetting resin and a microencapsulated curing agent for curing the thermosetting resin, the microencapsulated curing agent comprising an organic peroxide curing agent and a polyurethane resin encapsulating the organic peroxide curing agent, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 4 wt. %.

B. The molding compound of A, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 18 wt. %.

C The molding compound of A or B, wherein the microencapsulated curing agent contains at least about 30 wt. % organic peroxide curing agent.

D. The molding compound of any one of A-C, wherein the polyurethane resin is formed from a polyol, an optional amine and at least one isocyanate selected from the group consisting of xylylene diisocyanate, hydrogenated xylylene diisocyanate, hexamethylene diisocyanate, isophorone diisocyanate and polyisocyanates obtained from these diisocyanates.

E The molding compound of any one of A-D, wherein the microencapsulated curing agent has a chemical stability such that, when soaked in styrene monomer for 48 hours at 23° C., the microencapsulated curing agent exhibit a decrease in the amount of the organic peroxide curing agent contained therein of no more than 15 wt. %.

F. The molding compound of any one of A-E, wherein the organic peroxide curing agent, when heated to 40° C. for 48 hours, exhibits an active oxygen residual ratio of at least 80%, and further wherein the organic peroxide curing agent exhibits a one minute half life temperature of about 115° C. to 140° C.

G. The molding compound of A, wherein the microencapsulated curing agent when heated to 100° C. for 30 minutes exhibits a loss of weight of no greater than 5 wt. %, and further wherein the microencapsulated curing agent when heated to 140° C. for 5 minutes exhibits a loss of weight of at least 4 wt. %.

H. The molding compound of claim G, wherein the microencapsulated curing agent contains 15 to 70 wt. % organic peroxide curing agent based on the weight of the microencapsulated curing agent as a whole.

I. The molding compound of any one of A-H, wherein the thermosetting resin is an unsaturated polyester resin.

J. A microencapsulated curing agent for use in curing a thermosetting resin, the microencapsulated curing agent comprising an organic peroxide curing agent and a polyurethane resin encapsulating the organic peroxide curing agent, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 4 wt. %.

K. The microencapsulated curing agent of J, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 18 wt. %.

L. The microencapsulated curing agent of J or K, wherein the microencapsulated curing agent contains at least about 30 wt. % organic peroxide curing agent.

M. The microencapsulated curing agent of any one of J-L, wherein the polyurethane resin is formed from a polyol, an optional amine and at least one isocyanate selected from the group consisting of xylylene diisocyanate, hydrogenated xylylene diisocyanate, hexamethylene diisocyanate, isophorone diisocyanate and polyisocyanates obtained from these diisocyanates.

N. The microencapsulated curing agent of one of J-M, wherein the microencapsulated curing agent has a chemical stability such that, when soaked in styrene monomer for 48 hours at 23° C., the microencapsulated curing agent exhibit a decrease in the amount of the organic peroxide curing agent contained therein of no more than 15 wt. %.

O. The microencapsulated curing agent of J, wherein the microencapsulated curing agent when heated to 100° C. for 30 minutes exhibits a loss of weight of no greater than 5 wt. %, and further wherein the microencapsulated curing agent when heated to 140° C. for 5 minutes exhibits a loss of weight of at least 4 wt. %.

P. The microencapsulated curing agent of O, wherein the microencapsulated curing agent contains 15 to 70 wt. % organic peroxide curing agent based on the weight of the microencapsulated curing agent as a whole.

Q. A process for forming a microencapsulated curing agent for use in curing a thermosetting resin, the microencapsulated curing agent comprising an organic peroxide curing agent and a polyurethane resin encapsulating the organic peroxide curing agent, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 4 wt. %., the process comprising (a) dissolving the organic peroxide curing agent and the isocyanate forming the polyurethane in an organic solvent which is essentially immiscible with water and a non-solvent for the polyol and optional polyamine forming the polyurethane, (b) emulsifying the organic solution so formed in an aqueous phase by vigorous mixing, and then (c) adding the polyol and optional polyamine to the emulsion so formed with continuous mixing to cause the polyurethane to form at the interface of the emulsified particles.

R. The process of Q, wherein the polyurethane resin is formed from a polyol, an optional amine and at least one isocyanate selected from the group consisting of xylylene diisocyanate, hydrogenated xylylene diisocyanate, hexamethylene diisocyanate, isophorone diisocyanate and polyisocyanates obtained from these diisocyanates.

S. The microencapsulated curing agent of J, wherein the microencapsulated curing agent when heated to 100° C. for 30 minutes exhibits a loss of weight of no greater than 5 wt. %, and further wherein the microencapsulated curing agent when heated to 140° C. for 5 minutes exhibits a loss of weight of at least 4 wt. %.

T. The microencapsulated curing agent of S, wherein the microencapsulated curing agent contains 15 to 70 wt. % organic peroxide curing agent based on the weight of the microencapsulated curing agent as a whole.

U. A process for making a fiber reinforced composite comprising the molding compound of A further containing and at least one of glass fibers and carbon fibers into a desired shape and then heating the shaped mixture so formed to cause the organic peroxide curing agent of the molding composition to decompose and thereby cure the thermosetting resin in the molding composition.

V. The process of claim U, wherein the polyurethane resin of the molding composition is formed from a polyol, an optional amine and at least one isocyanate selected from the group consisting of xylylene diisocyanate, hydrogenated xylylene diisocyanate, hexamethylene diisocyanate, isophorone diisocyanate and polyisocyanates obtained from these diisocyanates.

W. The microencapsulated curing agent of V, wherein the microencapsulated curing agent when heated to 100° C. for 30 minutes exhibits a loss of weight of no greater than 5 wt. %, and further wherein the microencapsulated curing agent when heated to 140° C. for 5 minutes exhibits a loss of weight of at least 4 wt. %.

X. The microencapsulated curing agent of W, wherein the microencapsulated curing agent contains 15 to 70 wt. % organic peroxide curing agent based on the weight of the microencapsulated curing agent as a whole.

Y. A microencapsulated curing agent composed of a polyurethane shell and 30-70 wt. % organic peroxide curing agent.

Although only a few embodiments of this invention have been described above, it should be appreciated that many modifications can be made without departing from the spirit and scope of the invention. All such modifications are intended to be included within the scope of this invention, which is to be limited only by the following claims:

The invention claimed is:

1. A molding compound comprising a thermosetting resin and a microencapsulated curing agent for curing the thermosetting resin, the microencapsulated curing agent comprising an organic peroxide curing agent and a polyurethane resin encapsulating the organic peroxide curing agent,
wherein the polyurethane resin is made from
(i) at least one isocyanate selected from the group consisting of xylylene diisocyanate, hydrogenated xylylene diisocyanate, hexamethylene diisocyanate, isophorone diisocyanate and polyisocyanates obtained from these diisocyanates,
(ii) a polyol comprising a polyethylene glycol having molecular weight of 200 to 20,000, and
(iii) about 20 to 48 wt. % of a polyamine, the percent being based on the combined amounts of polyol and polyamine,
wherein the microencapsulated curing agent is made by a process comprising
(a) dissolving the organic peroxide curing agent and the isocyanate forming the polyurethane in an organic solvent which is essentially immiscible with water and a non-solvent for the polyol and polyamine forming the polyurethane,
(b) emulsifying the organic solution so formed in an aqueous composition comprising water and a colloid-forming agent by vigorous mixing, and then
(c) adding the polyol and optional polyamine to the emulsion so formed with continuous mixing to cause the polyurethane to form at the interface of the emulsified particles,
wherein the microencapsulated curing agent when heated to 100° C. for 30 minutes exhibits a loss of weight of no greater than 10 wt. %, and further
wherein the microencapsulated curing agent when heated to 140° C. for 5 minutes exhibits a loss of weight of at least 4 wt. %.

2. The molding compound of claim 1, wherein the microencapsulated curing agent when heated to 100° C. for 30 minutes exhibits a loss of weight of no greater than 10 wt. %, and further wherein the microencapsulated curing agent when heated to 140° C. for 5 minutes exhibits a loss of weight of at least 18 wt. %.

3. The molding compound of claim 2, wherein the microencapsulated curing agent contains at least about 30 wt % organic peroxide curing agent.

4. The molding compound of claim 1, wherein the microencapsulated curing agent has a chemical stability such that, when soaked in styrene monomer for 48 hours at 23° C., the microencapsulated curing agent exhibit a decrease in the amount of the organic peroxide curing agent contained therein of no more than 15 wt. %.

5. The molding compound of claim 4, wherein the organic peroxide curing agent, when heated to 40° C. for 48 hours, exhibits an active oxygen residual ratio of at least 80%, and further wherein the organic peroxide curing agent exhibits a one minute half life temperature of about 115° C. to 140° C.

6. The molding compound of claim 1, wherein the microencapsulated curing agent when heated to 100° C. for 30 minutes exhibits a loss of weight of no greater than 5 wt. %, and further wherein the microencapsulated curing agent when heated to 140° C. for 5 minutes exhibits a loss of weight of at least 4 wt. %.

7. The molding compound of claim 6, wherein the microencapsulated curing agent contains 15 to 70 wt. % organic peroxide curing agent based on the weight of the microencapsulated curing agent as a whole.

8. The molding compound of claim 1, wherein the thermosetting resin is an unsaturated polyester resin.

9. The molding compound of claim 1, wherein the polyamine is a diamine.

10. The molding compound of claim 9, wherein the polyamine is hexamethylene diamine.

11. The molding compound of claim 10, wherein the colloid-forming agent is at least one of polyvinyl alcohol and hydroxymethyl cellulose.

12. The molding compound of claim 11, wherein the colloid-forming agent is polyvinyl alcohol.

13. The molding compound of claim 1, wherein the colloid-forming agent is at least one of polyvinyl alcohol and hydroxymethyl cellulose.

14. The molding compound of claim 13, wherein the colloid-forming agent is polyvinyl alcohol.

15. The molding compound of claim 1, wherein the polyethylene glycol has a molecular weight of 200 to 10,000.

16. The molding compound of claim 15, wherein the polyethylene glycol has a molecular weight of 200 to 5,000.

17. The molding compound of claim 16, wherein the polyamine is hexamethylene diamine.

18. The molding compound of claim 17, wherein the colloid-forming agent is polyvinyl alcohol.

* * * * *